Patented Sept. 26, 1950

2,524,010

UNITED STATES PATENT OFFICE 2,524,010

ELECTRODEPOSITION OF NICKEL

Arthur H. Du Rose, Euclid, and Paul W. Moy, Cleveland, Ohio, assignors to The Harshaw Chemical Company, Cleveland, Ohio, a corporation of Ohio No Drawing. Application July 12, 1946,
Serial No. 683,157

5 Claims. (Cl. 204—49)

This invention relates to electrodeposition of metals and more specifically to a process of and solutions for use in a process of electrodepositing nickel, characterized in that the resulting nickel electrodeposit is bright as it comes from the plating solution. More particularly, the present invention has to do with the discovery of cooperating addition agents suitable for use in an aqueous acid nickel plating solution containing nickel sulfate or a mixture of nickel sulfate with nickel chloride.

We have now discovered that excellent bright deposits of nickel can be produced by electrolyzing an aqueous, acid solution of a nickel electrolyte of the class consisting of nickel sulfate and mixtures of nickel sulfate with nickel chloride, if such solution also contains an effective amount of each of two cooperating addition agents, one of such addition agents being an organic compound soluble in the acid nickel solution to the extent of at least 0.1 gm. per liter, containing not more than ten carbon atoms in the molecule, exclusive of the CN group, and containing the group, —C≡N, attached to a carbon atom; and the other of said addition agents being a cyclic, organic compound soluble in the acid nickel solution to the extent of at least 0.2 gm. per liter and selected from the group consisting of saccharin, cyclic aromatic compounds and cycloolefine compounds which contain the group

wherein the carbon atom is nuclear carbon, and in which compound each of the remaining nuclear carbon atoms carries a group of the class consisting of hydrogen, methyl, ethyl, chlorine, bromine, CHO and phenyl. The first mentioned addition agent may be referred to as the organic cyanide brightener and should be maintained in the plating solution in a concentration from 0.1 to 1.0 gm. per liter, preferably from 0.25 to 0.75 gm. per liter, while the second mentioned addition agent which we prefer to call a carrier or regulator should be maintained in the solution in a concentration of from 0.2 to 15.0 gm. per liter, preferably from 1 to 7 gm. per liter.

Since the two above mentioned classes of addition agents are intrinsically and functionally distinct, they will be separately described and identified.

The substances of the first addition agent class, those containing the —C≡N group, are soluble to the extent of at least 0.1 gm. per liter in the plating solution (for example in a solution containing 240 gm. per liter $NiSO_4.6H_2O$, 37.5 gm. per liter of $NiCl_2.6H_2O$ and 37.5 gm. per liter of $H_3BO_3$, remainder water) and are those containing from 1 to 10 carbon atoms in the molecule exclusive of the carbon atom in the —C≡N group, for example:

A. *Organic cyanide brighteners*

1. Methyl cyanide (acetonitrile, $CH_3CN$)
2. Ethyl cyanide (propionitrile, $C_2H_5CN$)
3. Beta-chloro-propionitrile ($ClH_2CCH_2CN$)
4. Beta-bromo-propionitrile ($BrH_2CCH_2CN$)
5. Alpha,alpha,beta-trichloropropionitrile ($ClH_2CCl_2CCN$)
6. Ethylene cyanohydrin ($HOCH_2CH_2CN$)
7. Lactonitrile ($CH_3CHOHCN$)
8. Glycolonitrile ($HOCH_2CN$)
9. 3,3,3-trichloro-2-hydroxy-propionitrile ($Cl_3CCHOHCN$)
10. Acrylonitrile ($H_2C{:}CHCN$)
11. Beta-amino-propionitrile [$(NH_2)H_2CCH_2CN$]
12. Cyano acetic acid ($HOOCCH_2CN$)
13. Ethyl cyanoacetate ($C_2H_5OOCCH_2CN$)
14. Isopropylcyanoacetate [$(CH_3)_2CHOOCCH_2CN$]
15. Cyano-ethyl acetate ($NCCH_2CH_2OOCCH_3$)
16. Cyanoacetamide ($NCCH_2CONH_2$)
17. Butyl-cyano acetate ($C_4H_7OOCCH_2CN$)
18. Succinonitrile [$(CH_2CN)_2$]
19. Benzonitrile ($C_6H_5CN$)
20. Benzyl cyanide ($C_6H_5CH_2CN$)
21. 3-phenyl-propionitrile ($C_6H_5C_2H_4CN$)

From the foregoing examples of the organic cyanides, it will be seen that they are generally suitable irrespective of the type of substituent, the number of carbon atoms, within the limits of solubility, and whether saturated or unsaturated, aliphatic or aromatic. Examples are given of simple aliphatic and aromatic cyanides, halogen, hydroxy, amino and carboxy derivatives and esters of the carboxy derivatives. Numerous additional examples could be given but the above will be sufficient to illustrate the class. Solubility is the chief requisite. There is a variation in the desirability of these compounds, some being used up sooner than others and some being more expensive or less readily available. Some have better bright throwing power (i. e., give better brightness in recesses) than others and some give a more brilliant deposit or a more ductile deposit, than others; all, however, give bright deposits. Among the aliphatic organic cyanides we prefer those having from 1 to 6 carbon atoms exclusive of the carbon in the —C≡N group.

The carriers or regulators, constituting the second addition agent class are soluble in the plating solution (for example, in a solution consisting of 240 grams of $NiSO_4.6H_2O$, 37.5 grams $NiCl_2.6H_2O$, 37.5 grams of $H_3BO_3$ and water to make a liter) to the extent of at least 0.2 gram per liter. These include such materials as benzene, and thiophene sulfonic acids and salts thereof and halogen, methyl, ethyl, CHO and phenyl substitution products of the foregoing, such as for example:

B. *Carriers or regulators*

1. Benzene mono-sulfonic acid ($C_6H_5SO_3H$)
2. Benzene disulfonic acids ($C_6H_4(SO_3H)_2$)
3. Sodium benzene monosulfonate ($C_6H_5SO_3Na$)
4. Nickel benzene monosulfonate (($C_6H_5SO_3)_2Ni$)
5. Monochlor benzene monosulfonic acids ($ClC_6H_4SO_3H$)
6. Benzene monosulfonamide ($C_6H_4SO_2NH_2$)
7. Saccharine, sodium salt ($C_6H_4SO_2CONNa$)
8. Dichloro benzene disulfonic acids ($Cl_2C_6H_2(SO_3H)_2$)
9. 2,5-dibromo benzene sulfonic acid ($Br_2C_6H_3SO_3H$)
10. Toluene sulfonic acids ($CH_3C_6H_4SO_3H$)
11. Benzaldehyde sulfonic acid ($C_6H_4(CHO)SO_3H$)
12. Diphenyl sulfonic acid ($C_6H_5C_6H_4SO_3H$)
13. Benzene sulfonyl chloride ($C_6H_5SO_2Cl$)
14. Para chloro benzene sulfonamide ($ClC_6H_4SO_2NH_2$)
15. Xylene sulfonamide (($CH_3)_2C_6H_3SO_2NH_2$)
16. Para toluene sulfonamide ($CH_3C_6H_4SO_2NH_2$)
17. Thiophene sulfonic acid ($C_4H_3S.SO_3H$)
18. Diphenyl sulfone ($C_6H_5SO_2C_6H_5$)

Potassium and cobalt salts are usable as well as the sodium and nickel salts indicated above.

From these examples it becomes clear that numerous single ring compounds containing the effective group can be used with excellent results, whether aromatic, such as the benzene sulfonic acids or heterocyclic with aromatic characteristics, such as thiophene sulfonic acid. Various substituents on the ring structure are exemplified. Fused ring structures such as naphthalene sulfonic acids are effective to produce brilliant deposits but are distinctly less desirable than the single ring type of compounds since they produce excessive brittleness as compared with the single ring compounds.

It is to be understood that all statements made herein concerning the capabilities of the addition agents presuppose the use of one or a mixture of two or more from each class. The carrying agents produce a degree of brightness without any brightener but not enough to be satisfactory alone. The cyanides in the absence of the carrier produce bright but brittle deposits. We prefer the use of the simpler and more common and readily available compounds and prefer to employ in each addition agent class only compounds devoid of the effective group which characterizes the other addition agent class.

A conventional aqueous acid nickel bath in which the combined use of the two classes of addition agents will be found to give improved results, as above indicated, consists of:

| | |
|---|---|
| $NiSO_4.6H_2O$ | 120–450 grams per liter |
| $NiCl_2.6H_2O$ | 15–75 grams per liter |
| $H_3BO_3$ | 15 grams per liter to saturation |
| Sodium lauryl sulfate [1] | 0 to 1.0 gram per liter |
| Current density | Up to 60 amp. per sq. ft. |
| pH | 2.5–6 |
| Temperature | Room to 170° F., preferably 120 to 140° F. |

[1] Where this compound is referred to, the material sold under the trade name of "Duponol M. E. Dry" is to be understood. It is sold as the technical compound. Other equivalent surface tension reducing agents may be used instead of Duponol. Preparations known as Tergitol 7 and Tergitol 08, sold by Carbide & Carbon Chemicals Company and said to be sodium secondary alcohol sulfates, may be used instead of Duponol. The quantities required are of the same order.

In the above table giving the composition of a conventional bath, sodium lauryl sulfate is added for the purpose of reducing the surface tension in order to prevent pitting of the plate. The sulfates of normal primary aliphatic alcohols, having from 8 to 18 carbon atoms, constitute a class of compounds preferred for use for this purpose.

The following table indicates a number of specific examples of aqueous acid nickel plating solutions illustrative of the invention:

Table

| Solution No. | 1 | 2 | 3 | 4 | 5 | 6 | 7 | 8 | 9 |
|---|---|---|---|---|---|---|---|---|---|
| $NiSO_4.6H_2O$, g./l. | 306 | 240 | 240 | 240 | 240 | 240 | 240 | 240 | 240 |
| $NiCl_2.7H_2O$, g./l. | ---- | 37.5 | 37.5 | 37.5 | 37.5 | 37.5 | 37.5 | 37.5 | 37.5 |
| $H_3BO_3$, g./l. | 37.5 | 37.5 | 37.5 | 37.5 | 37.5 | 37.5 | 37.5 | 37.5 | 37.5 |
| Sodium Lauryl Sulfate, g./l. | .25 | .25 | .25 | .25 | .25 | .25 | .25 | .25 | .25 |
| Brightener, g./l.: | | | | | | | | | |
|   Ethylene cyanohydrin | .72 | .28 | .28 | ---- | ---- | ---- | ---- | ---- | .30 |
|   Methyl cyanoacetate | ---- | ---- | ---- | ---- | ---- | .24 | ---- | ---- | ---- |
|   Cyanethylacetate | ---- | ---- | ---- | .24 | ---- | ---- | ---- | ---- | ---- |
|   Cyanacetamide | ---- | ---- | ---- | ---- | 1 | ---- | ---- | ---- | ---- |
| α-α-β-Trichloropropionitrile | ---- | ---- | ---- | ---- | ---- | ---- | ---- | .2 | ---- |
| Benzylacetonitrile | ---- | ---- | ---- | ---- | ---- | ---- | .4 | ---- | ---- |
| Carrier g./l.: | | | | | | | | | |
|   Benzene sulfonic acid | 5 | ---- | ---- | ---- | 1 | ---- | 5 | 5 | ---- |
|   Benzaldehyde sulfonic acid | ---- | 1 | ---- | ---- | ---- | ---- | ---- | ---- | ---- |
|   p-Toluene sulfonamide | ---- | ---- | 2 | ---- | ---- | ---- | ---- | ---- | ---- |
|   Saccharin | ---- | ---- | ---- | ---- | ---- | ---- | ---- | ---- | 1 |
|   Thiophene sulfonic acid | ---- | ---- | ---- | ---- | ---- | .9 | ---- | ---- | ---- |
|   Benzene Disulfonate, Ni salt | ---- | ---- | ---- | 1.5 | ---- | ---- | ---- | ---- | ---- | pH, 3.5–4.0. Temperature, 120° F.–140° F. Current density, 40–60 amps./sq./ft.
All the above examples produced bright and ductile nickel electrodeposits.

Having thus described our invention, what we claim is:

1. A process of producing bright deposits of nickel comprising electrolyzing an aqueous, acid solution of a nickel electrolyte of the class consisting of nickel sulfate and mixtures of nickel sulfate with nickel chloride, such solution also containing an effective amount of each of two cooperating addition agents, one of such addition agents being ethylene cyanohydrin and being maintained in said solution in concentration from 0.1 to 1.0 gm. per liter and the other of such addition agents being benzene monosulfonic acid and being maintained in said solution in concentration from 0.2 to 10 gm. per liter.

2. A process of producing bright deposits of nickel comprising electrolyzing an aqueous, acid solution of a nickel electrolyte of the class consisting of nickel sulfate and mixtures of nickel sulfate with nickel chloride, such solution also containing an effective amount of each of two cooperating addition agents, one of such addition agents being ethyl cyanoacetate and the other of said addition agents being saccharine, ethyl cyanoacetate being maintained in said solution in concentration from 0.1 to 1.0 gm. per liter and saccharine being maintained therein in concentration from 0.2 to 10 gm. per liter.

3. A method for electrodepositing nickel in the form of a deposit which is bright as taken from the plating solution without further treatment and which method comprises electrolyzing an aqueous, acid solution of a nickel electrolyte of the class consisting of nickel sulfate and mixtures of nickel sulfate with nickel chloride, said solution also containing cooperating addition agents capable of imparting brightness to the deposit, one of said addition agents being an aliphatic nitrile soluble in said solution to the extent of at least 0.1 gram per liter and having from 1 to 10 carbon atoms in the molecule exclusive of the carbon atom in the CN group and the other of said addition agents being an organic compound containing the

group, and being soluble in said solution to the extent of at least 0.2 gram per liter, the carbon atom in said

group being nuclear carbon forming part of a six-carbon aromatic ring, said first mentioned addition agent being present in concentration from 0.1 to 1.0 gram per liter and said second mentioned addition agent being present in concentration from 0.2 to 15 grams per liter.

4. The invention as defined in claim 1 further characterized in that said aliphatic nitrile has from 1 to 6 carbon atoms exclusive of the carbon atom in the CN group.

5. A method for electrodepositing nickel in the form of a deposit which is bright as taken from the plating solution without further treatment and which method comprises electrolyzing an aqueous, acid solution of a nickel electrolyte of the class consisting of nickel sulfate and mixtures of nickel sulfate with nickel chloride, said solution also containing cooperating addition agents capable of imparting brightness to the deposit, one of said addition agents being an organic nitrile selected from the group consisting of methyl cyanide, ethyl cyanide, beta-chloro-propionitrile, beta-bromo-propionitrile, alpha, alpha, beta-trichloro-propionitrile, ethylene cyanohydrin, lactonitrile, glycolonitrile, 3,3,3-trichloro-2-hydroxy-propionitrile, acrylonitrile, beta-amino-propionitrile, cyano acetic acid, ethyl cyanoacetate, isopropylcyanoacetate, cyanoethyl acetate, cyanoacetamide, butyl-cyano acetate, succinonitrile, 3-phenyl-propionitrile and the other of said addition agents being an organic compound containing the

group and selected from the class consisting of benzene mono-sulfonic acid, benzene disulfonic acids, sodium benzene monosulfonate, nickel benzene monosulfonate, monochlor benzene monosulfonic acids, benzene monosulfonamide, saccharine and its sodium salt, dichloro benzene disulfonic acids, 2,5-dibromo benzene sulfonic acid, toluene sulfonic acids, benzaldehyde sulfonic acid, benzene sulfonyl chloride, para chloro benzene sulfonamide, xylene sulfonamide, para toluene sulfonamide, and diphenyl sulfone, said first mentioned addition agent being present in concentration from 0.1 to 1.0 gram per liter and said second mentioned addition agent being present in concentration from 0.2 to 15 grams per liter.

ARTHUR H. DU ROSE.
PAUL W. MOY.

REFERENCES CITED

The following references are of record in the file of this patent:

UNITED STATES PATENTS

| Number | Name | Date |
|---|---|---|
| 2,085,754 | Hull | July 6, 1937 |
| 2,238,861 | Lind et al. | Apr. 15, 1941 |

FOREIGN PATENTS

| Number | Country | Date |
|---|---|---|
| 670,220 | Germany | Jan. 14, 1939 |

OTHER REFERENCES

Metal Finishing, November 1941, page 611 (an article by Linick).

Metal Industry, December 11, 1942, pp. 379, 380 (an article by Henricks).